(12) United States Patent
Braunheim

(10) Patent No.: US 10,371,108 B2
(45) Date of Patent: Aug. 6, 2019

(54) FUEL FILTER

(71) Applicant: Mahle International GmbH, Stuttgart (DE)

(72) Inventor: Michael Braunheim, Goppingen (DE)

(73) Assignee: Mahle International GmbH (DE)

( * ) Notice: Subject to any disclaimer, the term of this patent is extended or adjusted under 35 U.S.C. 154(b) by 0 days.

(21) Appl. No.: 15/256,035

(22) Filed: Sep. 2, 2016

(65) Prior Publication Data

US 2017/0009716 A1 Jan. 12, 2017

Related U.S. Application Data

(63) Continuation of application No. 12/304,831, filed as application No. PCT/EP2007/055469 on Jun. 4, 2007, now abandoned.

(30) Foreign Application Priority Data

Jun. 16, 2006 (DE) .......................... 10 2006 028 148

(51) Int. Cl.
*F02M 37/46* (2019.01)
*F02M 37/00* (2006.01)
*B01D 35/153* (2006.01)
*F02M 37/22* (2019.01)
*B01D 35/147* (2006.01)
*B01D 35/30* (2006.01)
*F02M 37/04* (2006.01)
(Continued)

(52) U.S. Cl.
CPC ....... *F02M 37/0052* (2013.01); *B01D 35/147* (2013.01); *B01D 35/153* (2013.01); *B01D 35/16* (2013.01); *B01D 35/30* (2013.01); *F02M 37/04* (2013.01); *F02M 37/22* (2013.01); *F02M 37/46* (2019.01); *F02N 15/10* (2013.01); *B01D 2201/4007* (2013.01); *F02N 2200/02* (2013.01)

(58) Field of Classification Search
CPC .................................................... B01D 35/153
See application file for complete search history.

(56) References Cited

U.S. PATENT DOCUMENTS 3,295,507 A * 1/1967 Carter ...................... F01M 1/10
123/196 A
4,997,555 A * 3/1991 Church .............. B01D 17/0211
210/136

(Continued)

*Primary Examiner* — Peter Keyworth

(74) *Attorney, Agent, or Firm* — Fishman Stewart PLLC

(57) ABSTRACT

A fuel filter for a fuel supply system of an internal combustion engine may include a filter housing, which may have an untreated-side inlet, a treated-side outlet, and an untreated-side return line. The fuel filter may also include a filter element arranged in the filter housing, and a closure element, which in an operationally ready state of the fuel filter may close off the return line. The fuel filter may include an untreated space and a treated space, and may separate in the filter housing the untreated space communicating with an inlet and the return line from the treated space communicating with the outlet. The fuel filter may further include a pressure sensor configured to measure a pressure build-up in the treated space, wherein the fuel filter may be configured to enable the pressure build-up to reach a predetermined threshold at which the engine may be started.

14 Claims, 3 Drawing Sheets

(51) Int. Cl.
*F02N 15/10* (2006.01)
*B01D 35/16* (2006.01)

(56) References Cited

U.S. PATENT DOCUMENTS 6,159,383 A * 12/2000 Gullett .................. F02M 37/14
 123/509
6,706,181 B1 * 3/2004 Baumann ............... B01D 29/21
 210/236

* cited by examiner

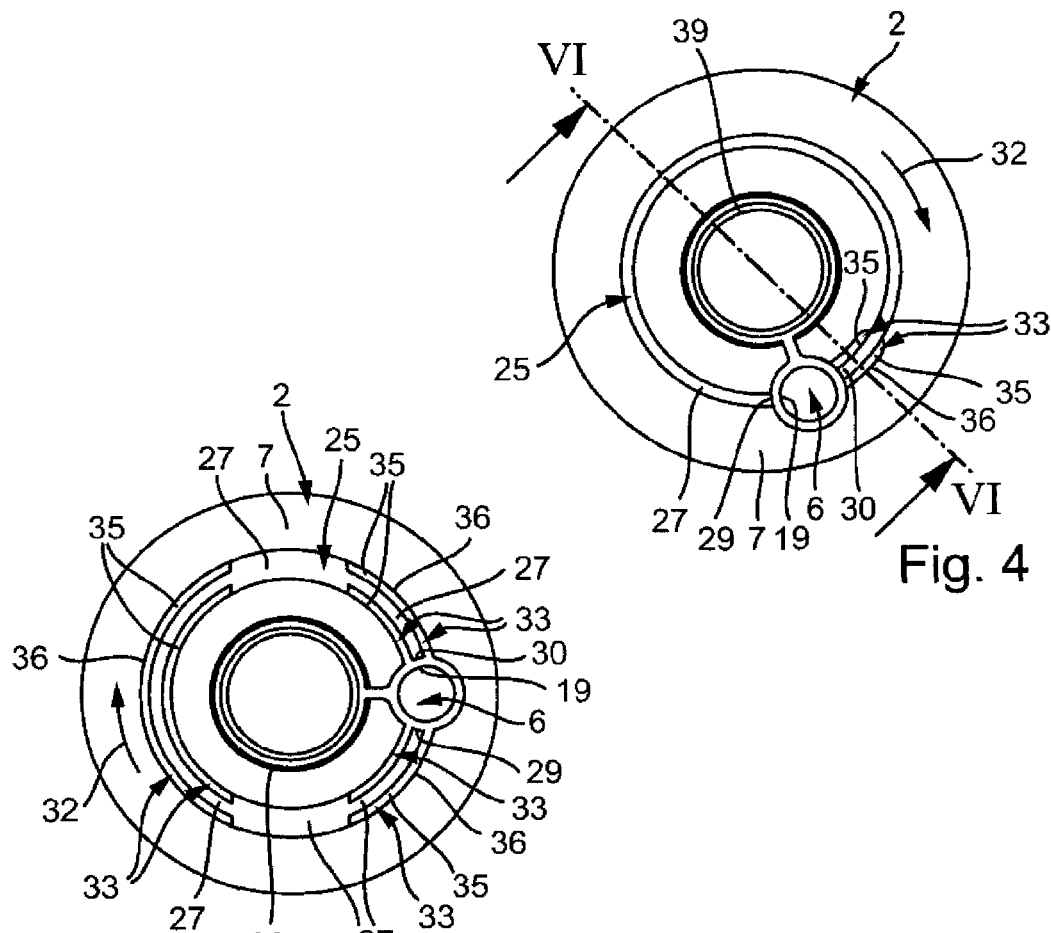
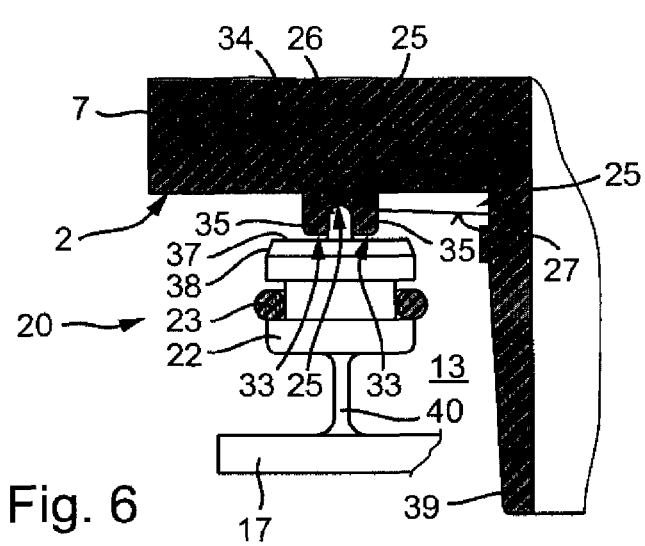

FUEL FILTER

CROSS-REFERENCES TO RELATED APPLICATION

This application is a continuation of and thus claims priority to U.S. patent application Ser. No. 12/304,831, filed Dec. 15, 2008, which is a National Stage application which claims the benefit of International Application No. PCT/EP2007/0555469 filed Jun. 4, 2007, which claims priority based on German Patent Application No. DE 10 2006 028 148.9, filed Jun. 16, 2006, all of which are hereby incorporated by reference in their entirety.

TECHNICAL FIELD

The present invention relates to a fuel filter for a fuel supply system of an internal combustion engine, in particular in a motor vehicle.

BACKGROUND

Internal combustion engines have a fuel supply system for their supply with liquid fuel. Such a fuel supply system comprises typically a fuel tank, a fuel pump, a fuel filter, and an injection system. To reduce the risk of damage of the injection system or the internal combustion engine, respectively, it is required to clean the fuel supplied to the internal combustion engine from contamination carried along with the fuel. Hence, the fuel filter is a component which is relevant for the functional reliability of the internal combustion engine. Such a fuel filter has typically a filter housing which comprises an untreated-side inlet and a treated-side outlet. Furthermore, a filter element is provided, which is arranged in the filter housing and which separates in the filter housing an untreated space communicating with the inlet from a treated space communicating with the outlet. The filter element is a wear part which is replaced in certain maintenance intervals. When replacing the filter element, there is a risk that it is not properly installed in the filter housing. Moreover, there is a risk that the fuel filter is operated, accidentally or knowingly, without filter element. With missing or improper installed filter element, there is the risk that contamination can get unhindered to the injection system or to the internal combustion engine, respectively.

SUMMARY

The present invention is concerned with the problem to propose an improved embodiment for a fuel filter, for which in particular the risk is reduced that unfiltered fuel can get to the internal combustion engine.

This problem is solved in the invention by means of the subject matters of the independent claims. Advantageous embodiments are subject matter of the dependent claims.

The invention is based on the general idea to in addition provide the fuel filter with an untreated-side return line, which, in the operationally ready state, is closed by means of a closure element. In an inoperable state of the fuel filter, thus, for example, with missing closure element and/or missing filter element, the return line is open, so that fuel supplied through the inlet into the filter housing preferably flows off through the return line and, for example, flows back into the fuel tank. In this case, no, or not enough, fuel is supplied. Subsequently, the internal combustion engine cannot be started. The risk of damage of the injection system, or the internal combustion engine, respectively, can thereby be reduced. To ensure that with missing filter element, the fuel entering the filter housing exits through the return line and not through the outlet, the flow resistance through the return line to the tank, for example, can be rated considerably lower than the flow resistance from the outlet to the internal combustion engine. With inserted filter element and with missing or improper attached closure element, the return line to the untreated space is open, while the outlet towards the treated space is open and is separated by the filter element from the untreated space. By means of the filter element, an increased flow resistance is forced to occur towards the outlet. Accordingly, also in this constellation, the fuel discharges through the return line from the filter housing. In this constellation, the filter element subsequently prevents the supply of contamination to the internal combustion engine, whereby the same cannot be started at the same time, since it is not supplied, or only insufficiently, with fuel through the outlet.

In a preferred embodiment, the closure element is formed or arranged at the filter element such that the closure element, with a filter element properly inserted into the filter housing, closes off the return line. By means of this integrated construction, it is ensured that the return line is closed off only with inserted, and correctly inserted, filter element. In other words, the proper installation state of the filter element, or the operationally ready state of the fuel filter, respectively, is only given when the filter element is inserted into the filter housing such that the closure element closes off the return line. The reliability or the handling of the fuel filter is thereby improved.

In another embodiment, a positioning device can be provided, which comprises at least one positioning element on the filter element side, and one positioning element on the filter housing side, which interact during inserting of the filter element into the housing for finding of an orientation, which is aligned with the insertion direction of the closure element shaped as a pin, between the pin and a return line opening, which is open towards the untreated space, of the return line. By means of this design, during mounting of the fuel filter, the finding of the relative position between filter element and filter housing is made easier. The risk of a faulty installation is thereby reduced.

In another advantageous embodiment, a guiding device can be provided, which comprises at least one guiding element on the filter element side, and at least one guiding element on the filter housing side, which interact during insertion of the filter element into the filter housing according to the key-lock principle, such that they allow the interacting between the positioning elements of the positioning device only with matching guiding elements. By means of this construction, the risk is reduced that a wrong filter element, thus a filter element, which is not specifically adapted to the fuel filter, can be inserted into the filter housing. In the ideal case, an internal combustion engine, the fuel supply system of which is equipped with the fuel filter according to the invention, can be started only when the associated and correct filter element is properly inserted into filter housing.

Further important features are apparent from the subclaims, from the drawings, and from the associated description of the figures by means of the drawings.

It is to be understood the aforementioned and the following features still to be illustrated are not only usable in the respective mentioned combination, but also in other combinations or on its own, without departing from the scope of the present invention.

BRIEF DESCRIPTION OF THE DRAWINGS

Preferred exemplary embodiments of the invention are illustrated in the drawings, and are explained in the following description in more detail, wherein identical reference numbers refer to identical, or similar, or functionally identical components.

FIG. 4 shows a top view on the cover according to FIG. 3 corresponding to an arrow IV in FIG. 3, FIG. 5 shows a view as in FIG. 4, but for a different embodiment, FIG. 6 shows schematically a detail section along the section lines VI in FIG. 4.

DETAILED DESCRIPTION

Figure 1:
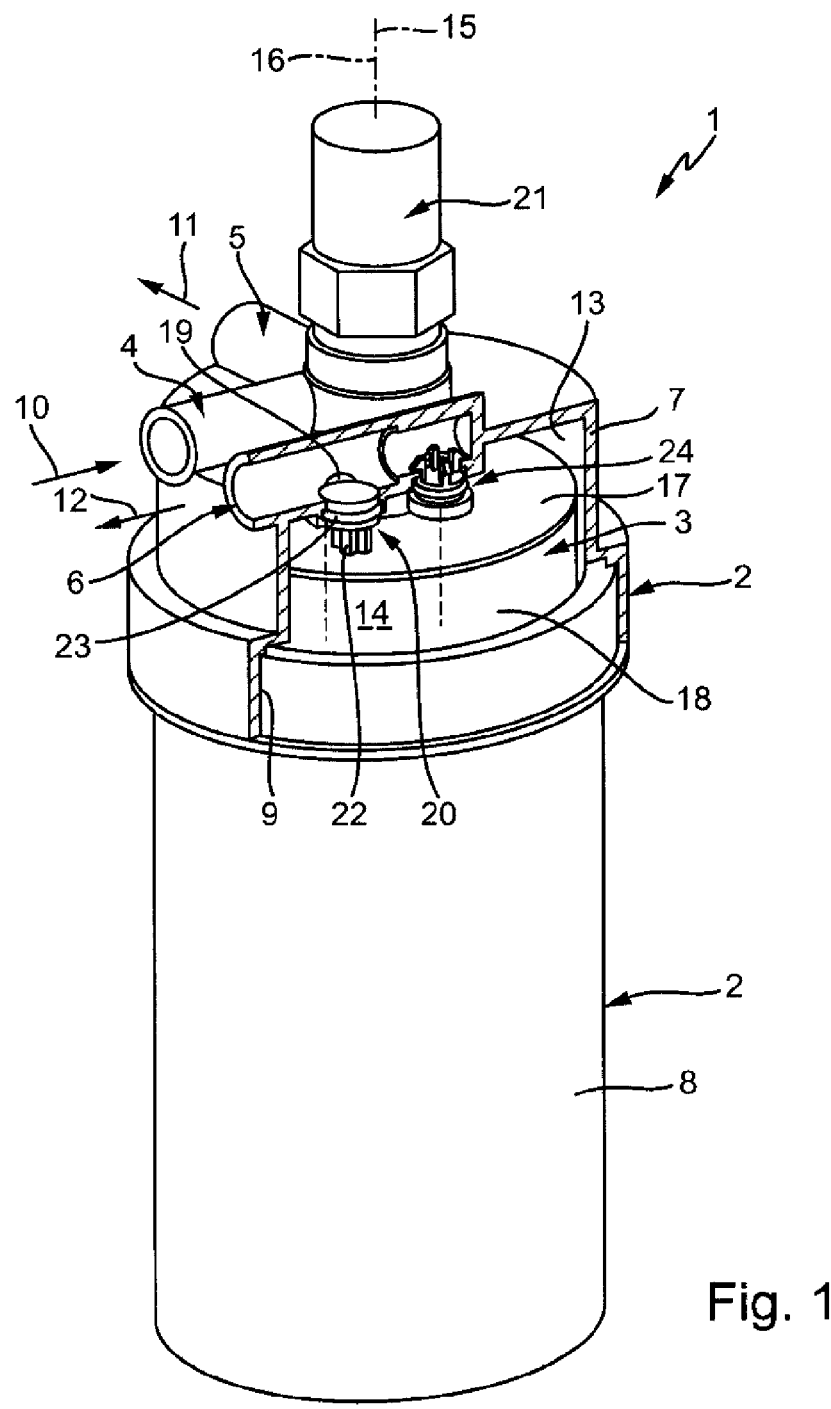
FIG. 1 shows schematically a perspective and partial cross section of a fuel filter.

According to FIG. 1, a fuel filter 1, which is suitable for filtering a liquid fuel, such as, e.g., gasoline or diesel, comprises a filter housing 2 and a filter element 3. The filter housing 2 comprises an untreated-side inlet 4, a treated-side outlet 5, and an untreated-side return line 6. The filter housing 2 is assembled from a cup-shaped cover 7 and a cup-shaped bottom 8, which can be screwed together by means of a threaded connection 9. Inlet 4, outlet 5 and return line 6 are formed here at the cover 7. The filter housing 2 is preferably provided for a hanging mounting position so that for maintenance of the fuel filter 1, the bottom 8 can be screwed off downwards, while the upper cover 7 remains stationary. Alternatively, a standing mounting position can also be provided, whereby then the cover 7 comprising the connections 4, 5, and 6 is arranged at the bottom, remains stationary, and functionally forms rather a "housing bottom", while in this mounting situation the bottom 8 is arranged at the top, and functionally rather forms a "housing cover". The axial dimension can vary here. In particular, in the standing arrangement, the cover 7, thus the functional housing bottom, can accommodate the bigger portion of the filter element 3, while in the shown hanging arrangement, the bottom 8 accommodates the bigger portion of the filter element 3.

The fuel filter 1 is provided for mounting into a fuel supply system of an internal combustion engine, which is preferably arranged in a motor vehicle. For this, the inlet 4 can be connected to an inlet line 10, symbolized by an arrow, of the fuel supply system, the outlet 5 to an outlet line 11, symbolized by an arrow, of the fuel supply system, and the return line 6 to a return pipe 12, symbolized by an arrow, of the fuel supply system. The inlet line 10 includes, for example, a fuel pump, and comes from a fuel tank. The outlet line 11 runs, for example, to a fuel injection system. The return pipe 12 runs preferably back to the fuel tank.

The filter element 3 is arranged in the mounted state of the fuel filter 1 in the filter housing 2 such that it separates within the filter housing 2 an untreated space 13 from a treated space 14. In the shown exemplary embodiment, the filter element 3, without restriction of the generality, is shaped as ring filter element, which, with respect to a longitudinal center axis 15 of the ring filter element 3, is arranged coaxial to a longitudinal center axis 16 of the filter housing 2. Furthermore, the ring filter element 3 includes at least one axial end disk 17, wherein in FIG. 1 only one end disk is visible. The respective end disk 17 borders axially a filter material 18 which allows a radial flow-through.

The inlet 4 communicates via an inlet opening, not shown here, with the untreated space 13, and the outlet 5 communicates via an outlet opening, not shown, with the treated space 14. Furthermore, the return line 6 communicates with the untreated space 13 as well. For this, the return line 6 includes, for example, a return line opening 19, which is open towards the untreated space 13.

For the fuel filter 1, in addition, a closure element 20 is provided which serves for closing off the return line 6 in the operationally ready state of the fuel filter 1. Here, the closure element 20 closes off, for example, the return line opening 19. In the operationally ready state of the fuel filter 1, hence with closed return line 6, the fuel pump supplies, during the operation of the fuel supply system, fuel through the inlet 4 into the untreated space 13. From the untreated space 13, the fuel gets through the filter material 18 radially to the treated space 14. From the treated space 14, the fuel discharges again through the outlet 5 from the filter housing 2. With missing closure element 20, or when the return line 6 is not closed off by the closure element 20, respectively, the fuel from the untreated space 13 can exit directly through the return line 6 out of the filter housing 2. The flow resistance through the filter material 18 to the treated side 14 hereby provides that within the treated space, thus at the outlet 5, the required fuel pressure for starting the internal combustion engine cannot be built up since the fuel from the untreated space 13 can discharge substantially unrestricted through the return line 6.

In the preferred embodiment shown here, the fuel filter 1 can in addition be equipped with a pressure sensor 21, by means of which the treated fuel pressure can be measured. The pressure sensor 21 is attached, for example, at the cover 7. For example, when starting the internal combustion engine, an engine control device can monitor the pressure build-up in the treated space, and generates the respective start signals for starting the internal combustion engine only at a sufficient pressure build-up. With a closed return line 6, the here required pressure in the treated space cannot build up, so that the necessary start signals are not generated. Besides, with an open return line 6, the pressure build-up in the treaded space can turn out so low that the required fuel supply for starting the internal combustion engine is not possible, so that the internal combustion engine cannot be started due to the insufficient or missing fuel supply. This construction is based on the idea that the unclosed return line is evaluated as an indication that the closure element 20 is not, or not properly, inserted into the return line opening 19, and/or that the filter element 3 is not, or not properly, inserted into the filter housing 2. The unclosed return line 6 can also indicate that a wrong filter element was inserted into the filter housing 2. In the mentioned states, the fuel filter 1 is not operationally ready. The internal combustion engine should then not be started to avoid damage of the internal combustion engine, or the injection system, respectively, by unfiltered fuel. By means of the proposed fuel filter 1, this goal is achieved comparatively easily and effectively.

In the preferred embodiment shown here, the closure element 20 is formed at the filter element 3, or is arranged thereon, respectively. Thus, the return line 6 is automatically closed off when the filter element 3 is inserted properly into the filter housing 2. A missing filter element 3, a wrongly inserted filter element, and the use of a wrong filter element 3 result in each case in an unclosed return line 6, whereby the starting of the internal combustion engine can be prevented.

In the example, the closure element 20 is arranged at the end disk 17 facing towards the cover 7. The closure element 20 is shaped here as pin 22, which projects axially from the end disk 17, thus parallel to the longitudinal center axis 15 of the ring filter element 3. The pin 22 interacts with the return line opening 19 for closing off the return line 6. In particular, the pin 22 can be plugged in axially into the return line opening 19. The pin 22 can be equipped with a radial seal 23, in particular with an O-ring. The return line opening 19 can be equipped with a fitting or a tube section, which are not described here in more detail. In the plugged-in state, the radial seal 23 causes a sufficient sealing of the return line opening 19.

In the embodiment shown here, the fuel filter 1 is additionally equipped with a vent throttle 24, through which the return line 6 also communicates with the untreated space 13. The vent throttle 24 is characterized by a flow-through resistance, which is substantially higher than the flow-through resistance of the filter element 3 and the outlet 5 with closed-off return line 6. With closed-off return line 6, the vent throttle 24 allows a ventilation of the filter housing 2 during starting of the internal combustion engine. In the subsequent normal operation, it allows a comparatively small return flow through the return line 6, which, however, due to the comparatively strong throttle effect of the vent throttle 24, does not hinder the required pressure build up in the treated space 14. In particular, the flow-through resistance of the vent throttle 24 is even higher than the flow-through resistance of the filter element 3 alone.

For a standing arrangement, a different, in particular higher, positioning of the vent throttle is thinkable. In the standing position, the return line 6, which is then arranged at the bottom, can serve as idle, which, at removal of the bottom 8 located at the top, or at pulling out of the filter element 3, opens up automatically.

Figure 2:
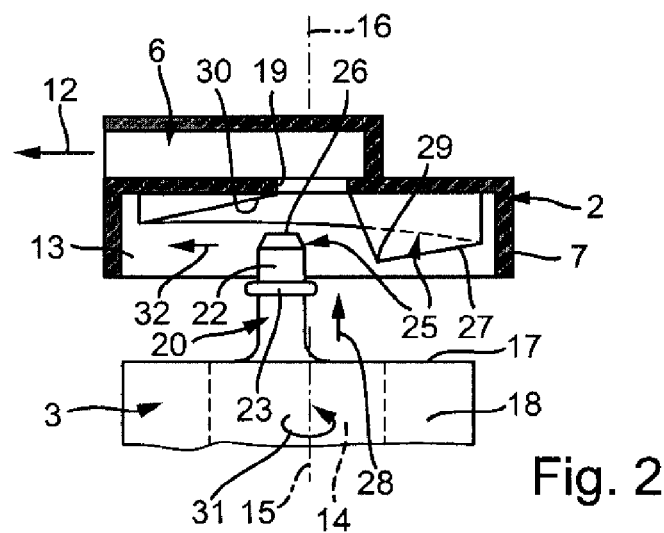
FIG. 2 shows schematically a partial cross section and a greatly simplified side view in the region of a return line during installation of a filter element.
Figure 3:
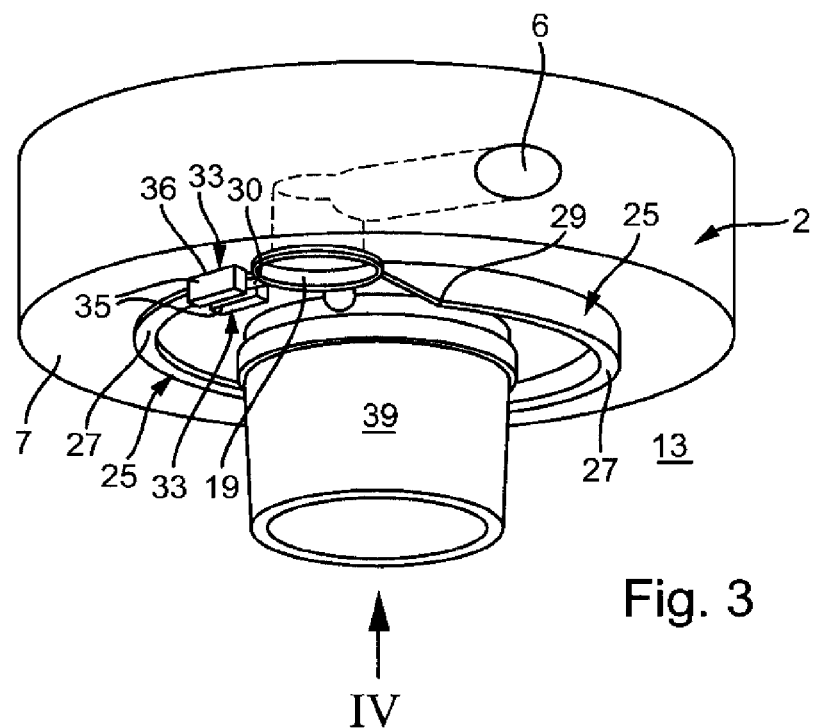
FIG. 3 shows schematically a perspective view on a cover of the filter housing in a simplified illustration.

According to FIG. 2, the fuel filter 1 can be equipped with a positioning device 25. The positioning device 25 comprises on the filter element side at least one position element, which is formed here by a slide face 26 at the free end of the pin 22, and, on the filter housing side, at least one positioning element, which is formed here by a ramp 27. The positioning elements 26, 27 are shaped such that they interact during placing of the filter element 3 into the filter housing 2 for finding of an orientation, which is aligned with the insertion direction of the pin 22, between the pin 22 and the return line opening 19.

In the preferred embodiments shown here, as a positioning element on the filter housing side, the said ramp 27 is provided, which projects axially into the untreated space 13. The ramp 27 begins at 29 at the return line opening 19 and ends at 30 at the return line opening 19 as well. Between its beginning 29 and its end 30, the ramp 27 extends circular or helical, respectively, concentric to the longitudinal center axis 16 of the filter housing. From its beginning 29 to its end 30, the ramp 27 declines towards the return line opening 19. The said slide face 26 is formed at the pin 22 as a position element on the filter element side, in fact on a side of the pin 22 remote from the end disk 17. Here, the pin 22 is arranged eccentrically with respect to the longitudinal center axis 15 of the filter element 3, wherein the eccentricity of the pin 22 is selected approximately equal to the radius of the ramp 27. Accordingly, the pin 22 can rest with its slide face 26 axially against the ramp 27 during insertion of the filter element 3, coaxial to the longitudinal center axis 16 of the filter housing 2. During turning of the filter element 3 around its longitudinal center axis 15 corresponding to an arrow 31, the pin 22 slides with its slide face 26 along the ramp 27. Hereby, the orientation of the pin 22 is forced to occur towards the return line opening 19. A corresponding sliding movement is symbolized in FIG. 2 by an arrow 32. The orientation of the ramp slope is preferably selected such that the turning direction during tightening of the bottom 8 is forced to generate the desired turning direction 31 for the filter element 3 arranged therein, whereby the filter element 3 during attaching of the bottom 8 automatically slides along the ramp 27. Upon obtaining the aligned orientation between pin 22 and the return line opening 19, the beginning 29 of the ramp 27 restricts a further turning of the filter element 3. With further tightening of the bottom 8, the filter element 3 is forced to be inserted corresponding to the insertion direction 28 with its pin 22 into the return line opening 19.

According to FIGS. 3 to 6, the fuel filter 1 can additionally be equipped with a guiding device 33. This guiding device 33 can comprise on the filter element side at least one guiding element, which, for example, can be formed by a guiding section 34 formed at the pin 22, as well as on the filter housing side at least one guiding element, which, for example, can be formed by one or more guiding walls 35. The guiding elements 34, 35 are shaped such that they interact during insertion of the filter element 3 into the filter housing 2 according to the "keylock principle". This means that the guiding elements 34, 35 allow interacting between the positioning elements 26, 27, thus between the ramp 27 and the slide face 26, only when the matching guiding elements 34, 35 interact with each other. In the case that the guiding elements 34, 35 interacting with each other during insertion of the filter element 3 into the filter housing 2 do not match, the interacting of the positioning elements 26, 27 for finding the aligned orientation between the pin 22 and the return line opening 19, is considerably hindered or made impossible by the guiding device 33.

In the shown embodiment, the guiding elements on the filter housing side are formed by guiding walls 35 which extend radially inside and/or radially outside along at least one extension section 36 of the ramp 27, thereby projecting beyond the ramp 27 in axial direction. In each of the examples of FIGS. 3 and 4, respectively, only one extension section 36 is provided, which is positioned in the region of the end 30 of the ramp 27. Here, in the extension section 36, two parallel guiding walls 35 are provided, one of which borders the ramp 27 radially inside and the other one radially outside. In the embodiment shown in FIG. 5, a total of three extension sections 36 are provided, in each of which two parallel extending guiding walls 35 are provided, which border the ramp 27 radially inside and outside. The guiding element on the filter element side of the embodiments shown here is formed by the guiding section 34, which projects axially on the side of the pin 22, which is facing away or is remote from the end disk 17. The said guiding section 34 comprises the slide face 26 of the pin 22. Furthermore, the guiding section 34 is adjusted with respect to its positioning at the pin 22 and with respect to its dimensioning to the guiding walls 35 such that the guiding section 34, during installation of the fuel filter 1, extends radially alongside the respective guiding wall 35 or between the two parallel guiding walls 35, respectively, thereby resting with the slide face 26 axially against the ramp 27 and keeping the pin 22 axially spaced apart from the respective guiding wall 35. This relationship is particularly apparent in FIG. 6. There, the guiding section 34 contacts the ramp 27 running between the guiding walls 35 with the slide face 26, and ensures an axial clearance between the walls 35 and an outer side 37, facing away from or remote from the end disk 17, of the pin 22, and from which the guiding section 34 projects. The said outer side 37 can be plane and can merge via a chamfer 38 into the rest of the pin 22.

The above mentioned key-lock principle now causes that the pin 22 with its slide face 26 can slide along the entire ramp 27 only until the aligned orientation to the return line opening 19 when the guiding section 34 is present, when the guiding section 34 is sufficiently narrow in radial direction to fit through the opposing guiding walls 35, and when the guiding section 35 is sufficiently long in axial direction to adjust the required axial clearance between pin 22 and the guiding walls 35. With missing or wrong guiding section 34, the pin 22 would rest against the face ends of the walls 35 when sliding along the ramp 27 in circumferential direction, whereby the turnability of the filter element 3 is blocked. Then, the filter element 3 cannot be readily installed properly.

In the FIGS. 3 to 6, in addition an outlet fitting 39 is illustrated, which is provided at the cover 7 and onto which the filter element can be slipped. FIG. 6 shows a special embodiment in which the pin 22 is attached through a web 40 to the end disk 17. Said web 40 is flexible in radial direction and allows a tolerance compensation between the radial position of the guiding section 34 and the radial position of the guiding walls 35. As is apparent from FIG. 1, the pin 22 also can be attached comparatively rigid to the end disk 17.

The invention claimed is:

1. An engine system comprising:
an internal combustion engine; and
a fuel supply system configured to supply fuel to the internal combustion engine, the fuel supply system having:
a fuel tank;
a fuel pump;
a fuel filter including:
a filter housing, which has an untreated-side inlet, a treated-side outlet and an untreated-side return line;
a filter element which is arranged in the filter housing, the filter element including an untreated space and a treated space, and which separates in the filter housing the untreated space communicating with an inlet and the return line from the treated space communicating with the outlet;
a closure element, which in an operationally ready state of the fuel filter closes-off the return line; and
a pressure sensor configured to measure a pressure build-up in the treated space, wherein the fuel filter is configured to enable the pressure build-up to reach a predetermined threshold at which the engine is started; and
an engine control device configured to monitor the pressure build-up in the treated space, and to generate a start signal for starting the internal combustion engine when the pressure-build up reaches the predetermined threshold.

2. The engine system according to claim 1, wherein the closure element is configured at the filter element, and, with the filter element inserted into the filter housing, closes-off the return line.

3. The engine system according to claim 1, wherein the closure element is arranged at an end disk of the filter element shaped as ring filter element having at least one axial end disk.

4. The engine system according to claim 3, wherein the closure element is shaped as a pin, the pin projects axially from the respective end disk, and which, for closing the return line, closes-off the return line opening, the return line opening connects the return line with the untreated space.

5. The engine system according to claim 1, wherein a positioning device is provided which comprises at least one positioning element on a filter element side, and at least one positioning element on a filter housing side, the positioning elements interact during insertion of the filter element into the filter housing for finding of an orientation, the orientation is aligned with an insertion direction of the closure element shaped as a pin, between the pin and the return line opening, the return line opening is open towards the untreated space, of the return line.

6. The engine system according to claim 5, wherein the filter housing comprises a ramp which projects into the untreated space, the untreated space begins at the return line opening, extends circular concentric to a longitudinal center axis of the filter housing, ends at the return line opening, and declines from a beginning of the ramp to an end of the ramp towards the return line opening; and
wherein the pin is arranged eccentric to a longitudinal center axis of the filter element and comprises a slide face, the slide face sliding along the ramp during turning of the filter element around the longitudinal center axis of the filter housing for orienting the pin towards the return line opening.

7. The engine system according to claim 6, wherein a guiding device is provided which comprises at least one guiding element on the filter element side, and at least one guiding element on the filter housing side, the guiding elements interact during insertion of the filter element into the filter housing according to a key-lock principle such that the at least one guiding element on the filter element side and the at least one guiding element of the filter housing side allow for at least one of the following:
interacting between the slide face and the ramp; and
interacting between the ramp and the slide face only in case the at least one guiding element on the filter element side matches the at least one guiding element on the filter housing side.

8. The engine system according to claim 7, wherein the ramp, along at least a portion of an extension section, is bordered at least one of radially inside and radially outside by at least one guiding wall, the guiding wall projects axially beyond the ramp; and
wherein the pin comprises an axially projecting guiding section, the axially projecting guiding section comprises the slide face, the axially projecting guiding section is positioned and dimensioned such that the axially projecting guiding section extends radially alongside the respective guiding wall and the axially projecting guiding section thereby rests the slide face axially against the ramp, and keeps the pin axially spaced apart from the respective guiding wall.

9. The engine system according to claim 1, wherein the return line in addition communicates with the untreated space through a vent throttle, the flow-through resistance of which is higher than the flow-through resistance through the filter element and through the outlet at the return line that is closed off.

10. The engine system according to claim 9, wherein the vent throttle is further configured to have the flow through resistance that allows a reduced return flow during a normal operation of the internal combustion engine, such that the reduced return flow does not hinder a pressure build up in the treated space.

11. The engine system of claim 9, wherein the filter housing comprises:
   a bottom container defining the cavity that has the filter element arranged therein; and
   a cover attached to the bottom container;
   wherein the cover defines the untreated-side inlet, the treated-side outlet, and the untreated-side return line;
   wherein the cover further defines the return line opening and a vent throttle opening such that the cavity and the return line communicate with one another through the return line opening and the vent throttle received in the vent throttle opening.

12. The engine system of claim 11, wherein the pressure sensor is arranged at the top of the cover.

13. The engine system according to claim 1, wherein the filter element is shaped as a ring filter element, and comprises at least one axial end disk, from which the closure element projects axially and eccentrically, and a filter element is inserted into a filter housing of the fuel filter, closes-off an untreated-side return line of the filter housing.

14. The engine system according to claim 13, wherein the closure element is a pin.

* * * * *